United States Patent
Haas et al.

(10) Patent No.: US 7,540,548 B2
(45) Date of Patent: Jun. 2, 2009

(54) AUTOMOBILE MARKETING APPARATUS

(76) Inventors: Jeffrey L Haas, 11222 Old Katy Rd., Houston, TX (US) 77043; L Keith Cline, 11222 Old Katy Rd., Houston, TX (US) 77043

( * ) Notice: Subject to any disclaimer, the term of this patent is extended or adjusted under 35 U.S.C. 154(b) by 696 days.

(21) Appl. No.: 10/840,726

(22) Filed: May 6, 2004

(65) Prior Publication Data

US 2005/0284876 A1 Dec. 29, 2005

(51) Int. Cl.
*B60R 13/10* (2006.01)
*G09F 21/04* (2006.01)

(52) U.S. Cl. .......................... 296/21; 40/591
(58) Field of Classification Search .................. 296/21; 40/591, 606.01, 606.07, 611.01, 611.12, 40/611.13
See application file for complete search history.

(56) References Cited

U.S. PATENT DOCUMENTS

| | | | |
|---|---|---|---|
| 4,375,134 A * | 3/1983 | Sheetz | 40/591 |
| 4,471,873 A * | 9/1984 | Thomas | 206/573 |
| 4,519,153 A * | 5/1985 | Moon et al. | 40/591 |
| 4,889,268 A * | 12/1989 | Shubeck | 224/277 |
| 4,986,209 A * | 1/1991 | Spica | 116/28 R |
| 5,011,039 A | 4/1991 | Crow | 220/357 |
| 5,084,994 A * | 2/1992 | Elmer | 40/591 |
| 5,320,061 A * | 6/1994 | Laughlin et al. | 116/28 R |
| D365,231 S * | 12/1995 | Hopper | D6/513 |
| 5,595,300 A * | 1/1997 | Paik et al. | 206/449 |
| 5,645,203 A * | 7/1997 | Tappenden | 224/482 |
| 5,850,957 A * | 12/1998 | Morris | 224/277 |
| 5,915,856 A * | 6/1999 | Yeranossian | 40/607.14 |
| 6,298,590 B1 * | 10/2001 | Levinson | 40/591 |
| 6,378,453 B1 * | 4/2002 | Conway | 116/28 R |
| 6,609,813 B1 * | 8/2003 | Showers et al. | 362/240 |
| 6,793,262 B2 * | 9/2004 | Sloan et al. | 296/37.9 |
| 6,957,755 B2 * | 10/2005 | Mahoney et al. | 224/413 |
| 7,066,105 B2 * | 6/2006 | Tal | 116/28 R |
| 2004/0079015 A1 * | 4/2004 | Tuttle | 40/661 |
| 2004/0163290 A1 * | 8/2004 | Pena | 40/591 |
| 2006/0048418 A1 * | 3/2006 | Boire et al. | 40/316 |

* cited by examiner

*Primary Examiner*—Hilary Gutman
(74) *Attorney, Agent, or Firm*—Wong, Cabello, Lutsch, Rutherford & Brucculeri, L.L.P.

(57) ABSTRACT

Disclosed herein is an apparatus for marketing automobiles. The device comprises a receptacle (preferably tubular) that may be attached to the automobile without risk of damage to the automobile. The receptacle may be used to contain documents providing information about the automobile to prospective purchasers.

24 Claims, 2 Drawing Sheets

AUTOMOBILE MARKETING APPARATUS

BACKGROUND

The present invention is in the field of automobile marketing. Traditionally automobile dealerships have relied upon salespeople to provide consumers with information about one or more vehicles that the consumer may be interested in purchasing. It is often advantageous to provide consumers with such information in a tangible form that a consumer may take with them for comparison shopping and consideration. Such information allows comparison of vehicle features and options between multiple automobiles of a particular model or between different makes and models within a particular segment. One form in which salespeople have provided information is in the form of manufacturer's brochures for new automobiles. Salespeople have also provided individualized information, such as customized data sheets detailing optional equipment, particularly on pre-owned automobiles for which manufacturer's brochures are no longer available.

However, for a variety of reasons, relying on salespeople to deliver tangible information about a particular vehicle is not always possible. One reason is that some customers choose to visit an automobile dealership outside the dealership's normal operating hours. This may be because of consumer scheduling constraints or because of consumer preference. Additionally, some states and/or localities have "blue laws" that require the dealership to be closed on certain days, and thus consumers shopping for vehicles on those days do not have the benefit of receiving information about an automobile in tangible form.

Thus, it would be beneficial to provide a means whereby an automobile dealership could provide tangible information about one or more automobiles to a consumer even when a salesperson is not available.

SUMMARY

The present invention relates to a means whereby an automobile dealership can provide tangible information about one or more automobiles to a consumer when a salesperson is not available. Particularly, as described herein is a novel automobile marketing device that comprises a receptacle that may be attached to the automobile. The receptacle may be used to contain documents providing information about the automobile to prospective purchasers. The receptacle may also be attached to the automobile without risk of damage to the automobile.

DETAILED DESCRIPTION

A novel automobile marketing device is described herein. The following embodiments of the invention are illustrative only and should not be considered limiting in any respect.

Figures 1, 2:
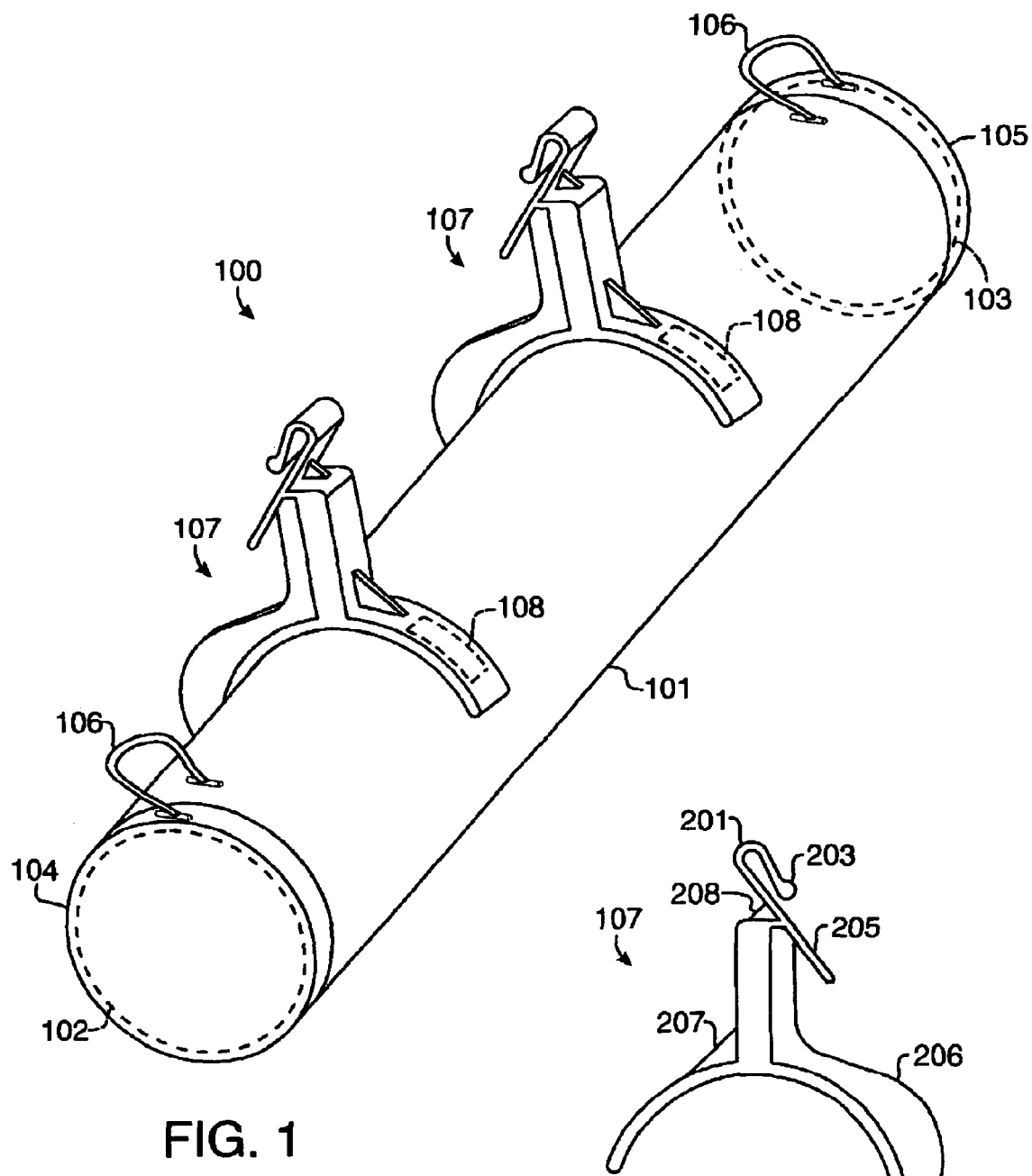
FIG. 1 is a perspective view of an automobile marketing device incorporating certain teachings of the present invention.
FIG. 2 illustrates a bracket used with an automobile marketing device incorporating certain teachings of the present invention.

An automobile marketing apparatus 100 according to certain teachings of the present invention is illustrated in FIG. 1. The automobile marketing apparatus 100 comprises a tube body 101, which is illustrated as being circular in cross-section (i.e., cylindrical) although other shapes may also be used. For example, although the marketing apparatus described herein is of a shape that the documents stored therein are going to be rolled or folded, the device may also be configured such that it is generally rectangular and allows sheets to be stored flat therein. The tube body 101 may be formed from any variety of materials, although the inventors have found that a transparent or translucent plastic material is preferable, particularly in the case where the documents are stored flat, so that they may be read through the tube body. Examples of suitable tube bodies are the extruded plastic tubes manufactured by VisiPak Corporation of Arnold, Mo., such as those made from a PETG (Polyethylene Terephthalate Copolymer) material or alternatively a butyrate material.

As to the dimensions of the tube body 101, a variety of sizes of tube bodies may be used. The inventors have found that a tube body having an outside diameter of approximately 3 inches and a wall thickness of approximately 0.025 inches is particularly suitable. Similarly, although a variety of lengths of tube body 101 may be used, the inventors have found that a tube body length of approximately 11½ inches is preferable.

Tube body 101 has a first end 102 and a second end 103. At least one end (for example, first end 102) of the tube body 101 must be open so that documents containing, for example, information about a particular automobile may be inserted therein. Thus second end 103 may be permanently sealed, for example by the molding process of tube body 101. An example of such a tube, which is particularly adapted to the present invention is the PermaSeal™ containers manufactured by VisiPak.

To provide protection from the elements for the documents contained within tube body 101 a removable endcap 104 should be provided for first end 102. As an alternative to sealing second end 103 by a piece unitary with tube body 101, a removable endcap 105 may be provided for second end 103. Endcap 105 may be truly removable or may be permanently affixed to the second end 103 using an adhesive appropriate for the materials used. The endcaps are preferably molded from a suitable plastic material, and a variety of suitable endcaps are also available from the VisiPak Corporation, as well as the Caplugs subsidiary of Protective Industries LLC of Buffalo, N.Y. Although not essential, it is preferred to provide a tether 106 for affixing the endcap 104 to tube body 101 so that it does not become lost and separated from the apparatus 100. Such a tether may be a plastic strap or other affixing means, a variety of which would be known to those skilled in the art.

Critical to the present invention are brackets 107, which allow the apparatus 100 to be attached to an automobile. Brackets 107 are discussed in more detail below with reference to FIG. 2, but, in general, the bracket features a distal end having a hook adapted to be clipped over the top of a window of an automobile. The window may then be "rolled up" providing a secure means of attaching the apparatus 100 to the automobile. Brackets 107 also features a proximal end that is curved with a circumference substantially corresponding to the circumference of tube body 101. If tube body has a cross-sectional shape other than circular, the proximal end of bracket 107 may be shaped accordingly. This proximal end is affixed to the tube body 101. A variety of techniques may be used, including adhesives, rivets and the like. The inventors have found that a double-sided adhesive tape 108, such as 3M part number 06382 or comparable, is a particularly advantageous means of securing bracket 107 to the tube body 101.

With reference now to FIG. 2, bracket 107 is illustrated in greater detail. As noted above, bracket 107 includes a distal end 201 and a proximal end 202. Distal end 201 comprises a hook 203, which is formed so as to be placed over the top portion of an automobile window. Surface 205 then rests on an outer face of the automobile window, which is rolled up to securely attach the apparatus 100 to the automobile. It is noted that the attachment means just described provides substantially no risk of damage to the automobile.

Figure 3:
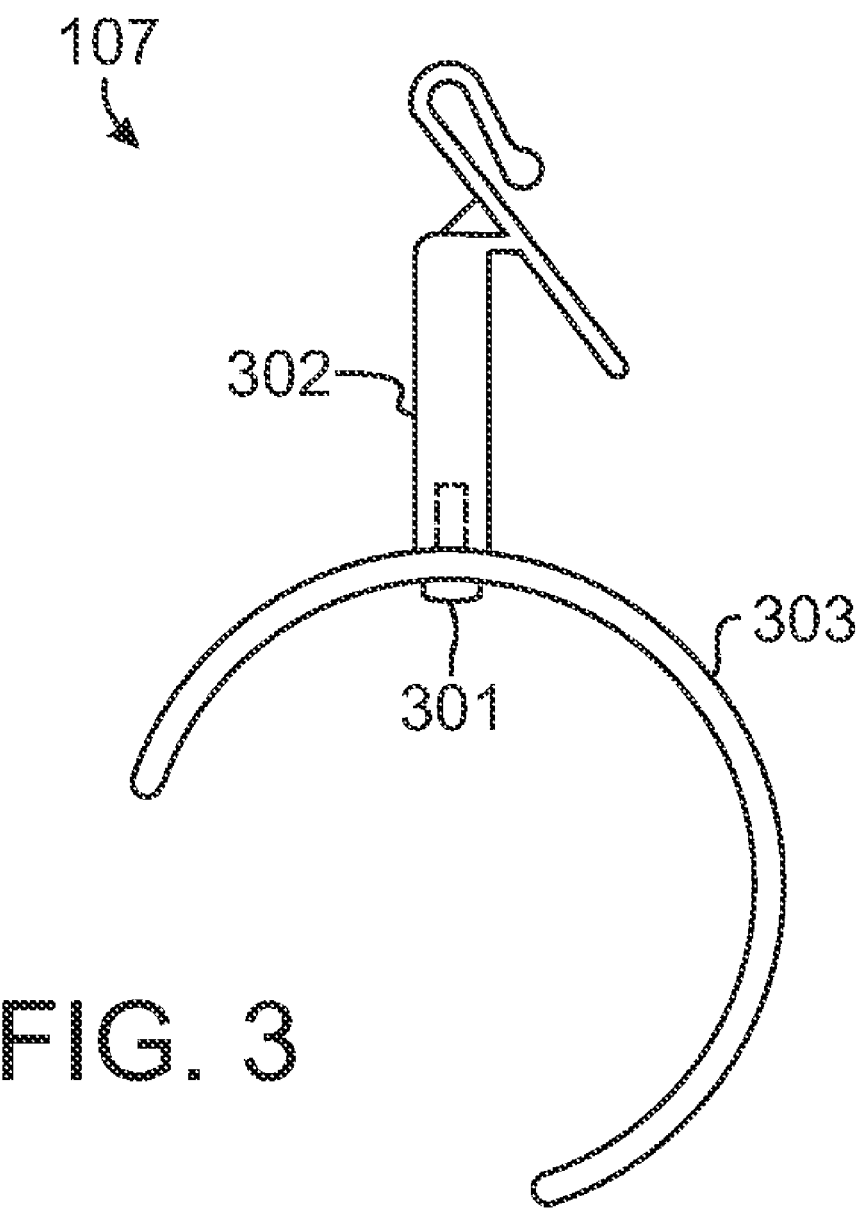
FIG. 3 illustrates a bracket comprising a plurality of pieces.

Bracket 107 also includes a proximal end 202, of which an inner surface 204 is attached to tube body 101 as described above. Bracket 107 further includes a plurality of ribs 206, 207, and 208, which are positioned so as to provide a suitable level of strength to the ribs. Bracket 107 is preferably formed of a suitable plastic material, such as polypropylene, by an injection molding process. Although bracket 107 is preferably a single, unitary molded piece, it may be molded as multiple pieces 302, 303, which may then be affixed together using adhesives or fasteners 301, such as screws, rivets, or the like, as illustrated in FIG. 3.

Use of the apparatus for marketing of automobiles is a fairly straightforward process. An automobile dealer or salesman attaches the apparatus 100 to the window of a car and rolls up the window, thereby securing apparatus 100. The dealer or salesperson then inserts into the apparatus one or more copies of information pertaining to the automobile or the dealership/salesman, for example, specifications, optional equipment, contact information, etc. A consumer who encounters the vehicle, for example, by visiting the dealership after business hours, and is interested in the vehicle may access the information provided and may take a copy for comparison shopping and/or reminder purposes.

While the invention has been disclosed with respect to a limited number of embodiments, numerous modifications and variations will be appreciated by those skilled in the art. It is intended that all such variations and modifications fall with in the scope of the following claims.

What is claimed is:

1. An apparatus attachable to an automobile for dispensing printed matter, the apparatus comprising:
    a tube body having at least one open end and adapted to receive the printed matter wherein the tube body is an extruded plastic tube made from a material selected from the group consisting of: polyethylene terephthalate copolymer and butyrate;
    at least one bracket affixed to the tube body, the bracket being adapted to attach to a window of the automobile.

2. The apparatus of claim 1 wherein the tube body is made from a transparent material.

3. The apparatus of claim 1 further comprising an endcap removably attached to close the at least one open end.

4. The apparatus of claim 3 wherein the endcap is tethered to the tube body.

5. The apparatus of claim 1 wherein the bracket is affixed to the tube body with an adhesive.

6. The apparatus of claim 5 wherein the adhesive is in the form of a double sided tape.

7. The apparatus of claim 1 wherein the at least one bracket comprises:
    a proximal end having a shape substantially corresponding to a cross-section of the tube body; and
    a distal end including a hook disposable over the top of the automobile window such that the bracket is securable to the automobile by disposing the hook over the window and rolling up the window.

8. The apparatus of claim 7 wherein the bracket is affixed to the tube body with an adhesive.

9. The apparatus of claim 8 wherein the adhesive is in the form of a double sided tape.

10. The apparatus of claim 7 wherein the bracket is a unitary molded piece.

11. The bracket of claim 7 wherein the bracket comprises a plurality of molded plastic pieces.

12. The bracket of claim 7 wherein the shape of the proximal end substantially corresponds to a circular cross-section.

13. A bracket adapted for use in connection with a device attachable to an automobile for distributing printed matter, the bracket comprising:
    a proximal end having a shape substantially corresponding to a cross-section of a tube body of the device; and
    a distal end including a hook disposable over the top of a window of an automobile such that the bracket is securable to the automobile by disposing the hook over the window and rolling up the window wherein the hook is J-shaped.

14. The bracket of claim 13 wherein the bracket is a unitary molded plastic piece.

15. The bracket of claim 13 wherein the bracket comprises a plurality of molded plastic pieces.

16. The bracket of claim 13 wherein the shape of the proximal end substantially corresponds to a circular cross-section.

17. An apparatus attachable to an automobile for dispensing printed matter, the apparatus comprising:
    a tube body having at least one open end and adapted to receive the printed matter;
    at least one bracket affixed to the tube body, the bracket including a hook configured to fit over the top of an automobile window such that the apparatus is securable to the automobile by rolling up the window wherein the hook is J-shaped.

18. The apparatus of claim 17 wherein the tube body is made from a material selected from the group consisting of: polyethylene terephthalate copolymer and butyrate.

19. The apparatus of claim 17 wherein the tube body is made from a transparent material.

20. The apparatus of claim 17 further comprising an endcap removably attached to close the at least one open end.

21. The apparatus of claim 20 wherein the endcap is tethered to the tube body.

22. The apparatus of claim 17 wherein the bracket is affixed to the tube body with an adhesive.

23. The apparatus of claim 22 wherein the adhesive is in the form of a double sided tape.

24. The bracket of claim 17 wherein the shape of the proximal end substantially corresponds to a circular cross-section.

* * * * *